United States Patent
Gillberg-LaForce

[11] Patent Number: 5,328,760
[45] Date of Patent: Jul. 12, 1994

[54] MICROPOROUS MEMBRANE FROM COLD-ROLLED PRECUSOR FILM

[75] Inventor: Gunilla E. Gillberg-LaForce, Summit, N.J.

[73] Assignee: Hoechst Celanese Corp., Somerville, N.J.

[21] Appl. No.: 984,711

[22] Filed: Dec. 2, 1992

Related U.S. Application Data

[62] Division of Ser. No. 294,332, Jan. 9, 1989, abandoned.

[51] Int. Cl.$^5$ .............................................. B32B 9/00
[52] U.S. Cl. ................................ 428/315.5; 428/195; 428/213; 428/315.7; 428/315.9; 428/409; 264/145; 264/290.2
[58] Field of Search ................... 428/195, 315.9, 315.5, 428/315.7, 213, 409; 264/145, 290.2

[56] References Cited

U.S. PATENT DOCUMENTS

| | | | |
|---|---|---|---|
| 3,083,410 | 11/1956 | McGlamery | 264/290.2 |
| 3,679,538 | 7/1972 | Druin et al. | 264/41 |
| 3,679,540 | 7/1972 | Zimmerman | 428/315.7 |
| 3,725,520 | 4/1973 | Suzuki et al. | 264/41 |
| 3,843,761 | 10/1974 | Bierenbaum et al. | 264/288.8 |
| 3,903,234 | 9/1925 | Ikeda et al. | 264/41 |
| 4,346,142 | 8/1982 | Lazear | 428/315.7 |
| 4,620,956 | 11/1986 | Hamer | 264/145 |
| 4,620,956 | 11/1986 | Hamer | 264/288.8 |
| 4,726,989 | 2/1988 | Mrozinski | 428/315.5 |
| 4,833,026 | 5/1989 | Kausch | 428/315.5 |
| 4,867,881 | 9/1989 | Kinzer | 428/315.9 |
| 5,049,347 | 9/1991 | Magill et al. | 264/280 |
| 5,120,594 | 6/1992 | Mrozinski | 428/195 |

Primary Examiner—Patrick J. Ryan
Assistant Examiner—Abraham Bahta
Attorney, Agent, or Firm—Joseph M. Mazzarese

[57] ABSTRACT

The process for forming a microporous polymeric semi-crystalline film, involving the steps of cold compressive extruding a precursor film, preferably in a biaxial fashion, so as to compress the film by a factor of about 2 to 1 to about 10 to 1, stretching the film by about 100 to about 500 percent, preferably in a biaxial fashion, and heat annealing either before, during, or preferably after the stretching step at a temperature up to the alpha transition temperature of the polymer for a time sufficient to maintain the microporous character of the final film.

11 Claims, 1 Drawing Sheet

MICROPOROUS MEMBRANE FROM COLD-ROLLED PRECUSOR FILM

This is a divisional of copending application(s) Ser. No. 07/294,332 filed on Jan. 9, 1989, now abandoned.

BACKGROUND OF INVENTION

1. Field of Invention

This invention relates to microporous films. More particularly, this invention relates to microporous films which are produced by a stretching and heat setting process.

2. Prior Art

The preparation of microporous films, i.e. films having a pore size in the range of about less than about 0.1 microns has been accomplished by a wide variety of methods in the prior art.

One method has involved the physical penetration of a precursor film such as by needle punching or by treatment with chemical agents or radiation.

A more common method of preparing microporous films has involved the addition of a leachable agent to a polymer melt. The film is then formed and the leachant is dissolved out of the film to leave behind a porous product. The disadvantage of this process, among others, is that it requires that polymeric films be treated with materials which diminish the properties of the final films, if they are not totally dissolved from the film. Leached microporous films are therefore often "contaminated" by the presence of the leachant.

U.S. Pat. No. 4,247,478 is typical of the prior art patents which have involved leaching of a material from a precursor film to form a microporous film. According to this patent, a thermoplastic polymer is dissolved in a compatible liquid, as defined in the patent, the solution is then allowed to assume the desired shape and is cooled under certain specified conditions. Thereafter, a portion of the compatible liquid is removed to form a microporous film.

U.S. Pat. Nos. 3,382,306; 3,558,764; and 3,679,538 disclose the preparation of a microporous film formed from a polyolefin, polyacetal, polyethylene sulfide, etc. Basically the process in forming these films involves the steps of melt extrusion under high stress, annealing, cold drawing, hot drawing and then heat setting. According to the process of these patents, melt extrusion under high stress serves to form a row nucleated precursor film the superstructure of which is further perfected by annealing. The resulting film is then drawn and heat set. While the products produced from these films have excellent properties, the resulting films are much larger in pore size than the films of the instant invention. Moreover, the "pores" of the films described in the above patents are more like slits than they are like true pores. Also, the process of these patents does not permit the manufacture of films having extremely large thicknesses because it is difficult to produce completely row nucleated products with thicker films. Finally, the films prepared according to these patents are extremely weak in the transverse direction.

U.S. Pat. No. 3,250,146 appears to disclose the biaxial treatment of various types of films. See also U.S. Pat. No. 2,494,334, U.S. Pat. No. 4,076,785, and U.S. Pat. No. 2,494,334. However, none of the films described in these patents are microporous in nature.

Accordingly, it is an object of this invention to prepare microporous films which are of greater thickness than those prepared in the prior art.

It is another object of this invention to prepare microporous films which are not contaminated with leachants or other materials.

It is another object of this invention to prepare microporous films which have uniform pore size distributions.

It is yet another object of this invention to prepare microporous films having pores which are generally circular in nature and which pores are extremely small in diameter.

These and other objectives are attained according to the process of the instant invention.

SUMMARY OF INVENTION

The instant invention involves a process for preparing microporous films from thermoplastic, semi-crystalline polymers, which comprise cold compressive extrusion of a precursor film so as to reduce its thickness from about 2 to 1 to about 10 to 1, stretching the resulting films from at least 100 to about 500 percent, preferably biaxially, and preferably, either before, during or after stretching, heat annealing the resulting stretched films, at a temperature below the melting temperature of the polymer to produce a stable microporous film having pore sizes in the range of about 10 nm to about 100 nm.

DETAILED DESCRIPTION OF DRAWING

FIG. 3 is the schematic of the process of the instant invention.

DETAILED DESCRIPTION OF INVENTION

Figure 1:
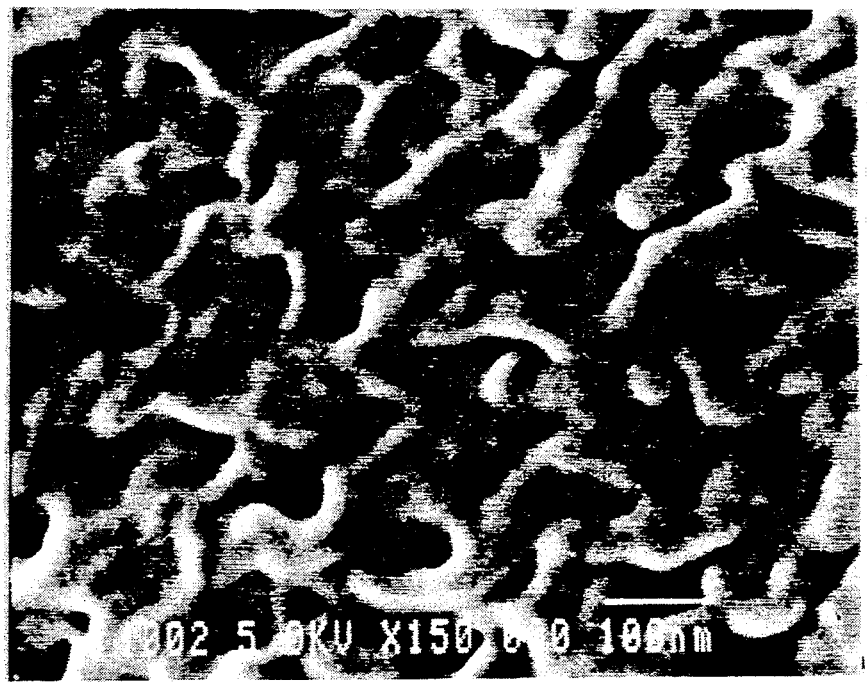
FIG. 1 shows an electron micrograph of the top surface of a film prepared according to the process of the instant invention. As can be seen from this electron micrograph, the microporous films of the instant invention have exceedingly small and uniform pore sizes and pore distributions with the average pore size being in the range of about 20 nm to about 50 nm.

The polymers which are used in forming the microporous films of the instant invention are thermoplastic in nature and may be formed from any polymer which is semi-crystalline, i.e., at least 30 percent, and preferably at least 40 to 65 percent, crystalline. The crystallinity of these polymers can be further improved by an optional annealing step. Examples of such polymers include polyethylene, polypropylene and other polyolefins, polyesters including polyethylene terephthalate, polyamides, including nylons such as nylon 66, polyhalolefins including polytetrafluoroethylene and ethylene tetrafluoroethylene and polyacetals such as polyoxymethylene polymers and copolymers, hydrophilic polymers such as hydrated polyvinylalcohol, polyvinylpyrrollidone and cellulose acetate. The preferred polymers for use in the instant inventions are polyolefins with the most preferred being polyethylene and polypropylene.

The films which can be rendered microporous according to the process of the instant invention can be formed using a variety of methods. Preferably, however, the films are prepared either by extrusion or by casting using standard techniques well known in the art.

In general, the thickness of the film at the beginning of the process of the instant invention can vary widely. As pointed out above, the process of the instant invention is particularly advantageous because it can be used to produce microporous, crystalline films which are quite thick in comparison to prior art microporous films. For example, the films which can be treated according to the process of the instant invention can range in thickness up to about 100 mils, preferably up to about 25 mils resulting in membranes with thicknesses up to 20 mils or less. The prior art commercial processes, on the other hand, including those applying either leaching or stretching and heat setting steps, are unable to practically produce membranes having thicknesses of more than about 1-2 mils.

1. Cold Compressive Extrusion

The first step of the instant invention is a cold compressive extrusion process. Generally this process involves cold-rolling of the films. By "cold compressive extrusion," it is meant that the temperature of the roll or other compressive extrusion means should be no more than approximately ambient conditions, i.e., no more than about 100 to 125 degrees F., preferably lower. Cold conditions are necessary so that the partially crystalline structure of the films of the instant invention is not melted by the temperature of the compression process except in the physical manner brought about by the actual compression or rolling itself. If higher temperature compression rolling is employed, the films of the instant invention are not rendered microporous or, if they are, they have widely varying and non-uniform properties. It must be recognized, however, that because of the degrees of compression which is utilized in forming the films of the instant invention and the associated deformation of the polymer film, there will be some heat build-up within the polymer film. However, the term "cold" refers, not to the temperature created by the compression, but only to externally supplied temperature which is applied to the rolls or other compression means used in the instant invention.

The amount of compression which is achieved in the compressive extrusion process can vary. However, preferably, it should be at least 2 and most preferably 3 to 1 up to about 8 and preferably no more than about 10 to 1. In other words, when the cold compression extrusion process is completed, the thickness of the film should be reduced at least 2 to 1 and preferably no more than about 10 to 1. Thus, utilizing a 20 mil film, the film can be reduced using the process of the instant invention to a film having a thickness of from about 10 to about 1 mils, preferably about 8 to about 2 mils. Simultaneously, as the thickness of the film is decreased, the overall surface area of the film is proportionately increased.

In order to ensure that the cold compressive extrusion is carried out evenly throughout the width of the film, it is preferred that several cold-rolling or compressive extrusion steps, i.e., from about 5 to about 25 or 30 or more be employed. In general, with each pass over the cold-rollers or the cold extruder, the film will be reduced from about 5 to about 25 percent in thickness. By utilizing a relatively large number of compressive extrusion passes, the amount of heat build-up on any individual pass is kept low. Several layers of film can be stacked leading to a more uniform deformation of each layer and more efficient production rates.

One of the major advantages of the process of the instant invention is that the invention is not limited by film thickness. With other prior art processes for forming microporous films, on the other hand, the practical thickness of the films is only about 2 mils for polypropylene films and about 1 mil for polyethylene films. However, the thickness of the films of the instant invention is not so limited and may range as high as 10–12 mils.

In carrying out the process of the instant invention, it is theorized that the compressive extrusion step serves to break up the spherulites, first by flattening them and then by twisting them, preferably to roughly a 45° angle. However, the inventors do not wish to be limited to any particular theory of operation of their invention. Rather, their invention is accomplished by carrying out the steps as described herein.

The rolls or other compressive extrusion means which are utilized for the compressive extrusion process should be sufficiently wide so that during the process the film will not extend beyond the working surface of the rolls. Roll separation and roll pressure should be sufficient to provide the desired degree of flattening of the film with each pass.

The compressive extrusion process of the instant invention is necessarily biaxial in nature because the pressure on the film causes the film to be extruded in both the machine and the transverse directions. However, in a particularly preferred process, biaxial orientation of the films of the instant invention is assured by cross-rolling of the film, i.e., the film is first inserted into the roll at an acute angle, e.g. 45° to the main axis of the roll and then is inserted into the same roll at an obtuse angle, e.g. 135° to that roll, thereby biaxially compressing the film.

2. Stretching

After the cold compressive extrusion process described above is carried out, the films of the instant invention must be stretched in order to impart the desired microporous character to these films. The amount of the stretching which may occur depends in part on the thickness of the film. In general, more stretching may be accomplished with thicker films. The minimum amount of stretching which is necessary in order to form microporous films according to the process of the instant invention is about 100 percent with maximum stretching ranging from about 400 to 500 percent. (For purposes of this invention 100 percent stretching involves a doubling of the length (or width) of a film sample.) For films which have been compressed at about the 8 to 1 ratio, stretches are typically less than about 200 percent. While at the 5 to 1 level the amount of stretching is higher—typically about 300 percent.

In determining the amount of stretching, it is also important to consider the degree of porosity which is desired in the final film. In general, the greater the stretching, the greater the porosity.

Stretching is carried out by methods commonly known in the prior art. Usually the stretching involves the employment of two sets of draw rolls wherein the second set of rolls is rotated or driven at a speed which is faster than the speed of rotation of the first set of rolls. (For example, in order to achieve 300 percent stretching the second set of rolls would be driven at three times the speed of the first set of rolls.) Biaxial stretching may be accomplished by utilizing a conventional draw frame whereby the sides of the film are stretched either sequentially following machine direction stretching or simultaneously with the machine direction stretching.

After the film is stretched, it is preferred, although not required, that the film be held in its stretched state for several minutes in order to ensure that the film does not unduly retreat to its unstretched state.

The temperature at which stretching occurs can vary from room temperature to higher temperatures or a combination thereof. Regardless of what temperature is chosen, however, it must be below the melting temperature of the polymer from which the film is formed. If higher temperature stretches are employed the resulting films may fuse and may not be microporous in nature or their microporosity may be significantly reduced.

If an elevated temperature is employed during the stretching step it is possible to eliminate or at least reduce the length of the heat annealing steps described below.

3. Heat Annealing

The films of the instant invention are rendered microporous by the stretching step described above. However, in order to obtain optimum microporosity of the films of the instant invention, as established by the stretching step, it is desirable that the films be heat annealed. The heat annealing step may be carried out either before, during or after the stretching step. In addition, the heat annealing step may be carried out both after cold compression and after the stretching step. The heat annealing step involves heating the film which is being treated to from about 5° C. to 100° C. below the melting point of the polymer, e.g., below 165° C. for polypropylene, and holding the film at that temperature in an oven for a period of from a few seconds to several hours depending on the temperature used. Heat setting of the films should be performed with the film being held under tension, preferably so only minor stretching or shrinkage occurs.

Figure 2:
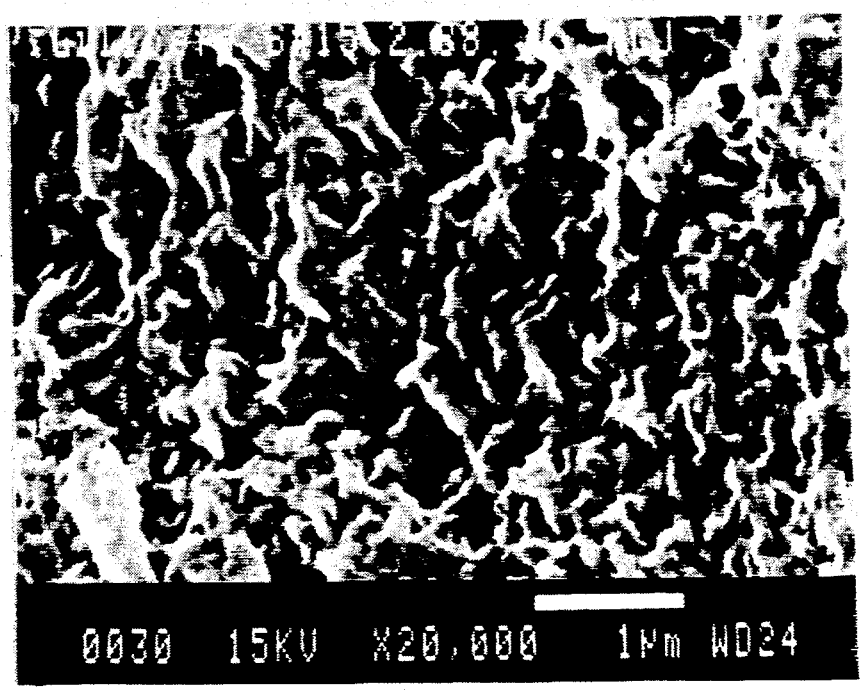
FIG. 2 shows a freeze fractured end view of a film prepared according to the process of the instant invention. As can be seen, the films of the instant invention have a foam-like internal structure.

The resulting films have a film thickness ranging from about 1 up to about 20 mils. The pore size of the films of the instant invention is quite small, averaging in the range of about 20 to 30 nanometers. The pores are relatively round in shape and the interior of the stretched, heat set film has an appearance very similar to that of a polymeric foam, wherein the foam walls contain small pores or openings. See the electron micrograph shown at FIG. 1 and FIG. 2. Void volumes are typically in the range of 45 to 65 percent.

The microporous films of the instant invention find utility in a wide variety of end use applications. The particular applications, of course, depend upon the film thickness, the polymer which is chosen for the film and the degree of microporosity imparted to the finished films of the instant invention. In general, however, these films are useful as sterilizable dressings, as filtration media, as sterilizable packaging, battery separators, etc.

In addition, the microporous films of the instant invention are particularly useful as permeation control films due to their balanced transfer properties, particularly when they are laminated to a regular fabric. These permeation control layer may be utilized to filter out undesirable chemical products, including particularly hazardous chemicals such as may appear in the laboratory or in certain battlefield situations. In order to form the film of the instant invention into a permeation control means, the film is treated with an activated charcoal or other agent useful in absorbing harmful chemicals. With the activated charcoal present in the pores of the films of the instant invention, a large amount of undesirable chemicals may be filtered out. At the same time the pore size of the films of the instant invention is such that water vapor will readily pass through them, making such films breathable, while at the same time protecting the wearer from hazardous chemicals.

EXAMPLE 1

Twenty-five 20 mil thick polypropylene extruded sheets were stacked one of top of the other to form a half inch thick stack. The stack was sandwiched between two steel sheets and inserted between two 12 inch diameter rolls in a rolling mill. The rolling gap was adjusted so that a 10 percent reduction of the initial stack thickness was obtained during each rolling pass. Between the passes, the stack was rotated 90 degrees so as to permit cross-rolling. A total of 20 passes, each reducing the thickness of the preceding stack by 10 percent, were made such that an ultimate reduction in thickness of each film sheet of 8 to 1 was obtained. The final film thickness of each sheet was therefore approximately 1.25 mils. The strength properties of the rolled film were compared to those of the precursor film and to a Celgard precursor film (Celgard is a registered trademark of the Hoechst Celanese Corporation) prior to hot and cold stretching and heat setting, with the following results:

TABLE I

| Sample | Tensile Strength (psi) | 0.2% Yield Strength (psi) | Modulus Tang (ksi) | Elongation at Failure % |
|---|---|---|---|---|
| Precursor (Example 1) | | | | |
| Longitudinal | 6,650 | 2,600 | 139 | 750 |
| Transverse | 6,200 | 2,400 | 142 | 800 |
| 8:1 Cold Compression (Example 1) | | | | |
| Longitudinal | 13,000 | 2,300 | 118 | 160 |
| Transverse | 15,200 | 2,100 | 111 | 170 |
| Celgard Precursor | | | | |
| Longitudinal | 11,200 | 5,700 | 174 | 290 |
| Transverse | 4,800 | 4,500 | 129 | 50 |

As can be seen from Table I, the 8:1 cross-rolled precursor film has very even strength properties in both the longitudinal and transverse directions, as compared to the Celgard precursor film. In addition, the tensile strength properties after cold compression were doubled in longitudinal direction and increased by about 2.5 times in the transverse direction.

The 8:1 cross-rolled film was then cold-stretched to 140 percent elongation and heat set in a 145° C. oven under tension to maintain constant length at 145° C. for 10 minutes. The film was then allowed to cool to room temperature before the tension was released. The resulting film was white in appearance. Its open celled microporous structure was apparent when the film was rapidly wet out with methanol, producing a clear, translucent film.

EXAMPLE 2

A 0.75 inch stack (about 40 sheets) of approximately 20 mil polypropylene sheets was cross-rolled using the procedures described in Example 1 until a reduction of approximately 5 to 1 in film thickness was obtained. Samples of the cross-rolled films were then annealed in air for one hour at 150° C., one under slight tension and the other under unrestrained conditions. The films were removed from the oven and allowed to cool. Mechanical testing of the films produced the following results:

TABLE II

| Sample | Tensile Strength (psi) | 0.2% Yield Strength (psi) | Modulus Tang (ksi) | Elongation at Failure % |
|---|---|---|---|---|
| After rolling but before annealing (Example 2) | 14,700 | 2,400 | 181 | 240 |
| Restrained annealed (Example 2) | 13,900 | 2,600 | 141 | 270 |
| Unrestrained annealed (Example 2) | 9,900 | 2,100 | 141 | 370 |

The unrestrained film shrank during the annealing thereby increasing in thickness from 4 to 6 mil. The film also was cold-drawn without localized necking. Extensive void formation was obtained at extensions of 150, 210 and 160 percent respectively. The unrestrained annealed film was cold drawn by 200 percent elongation and then heat set at 140° C. at constant length for 10 minutes, yielding a 6 mil thick microporous membrane.

EXAMPLE 3

A stack of 20 mil thick polypropylene sheets, as described in Example 1, were unidirectionally rolled at room temperature, using the Example 1 procedure, to a thickness reduction of about 5 to 1. The cold-rolled film was subsequently annealed in air under tension of 120 g for 30 minutes at 160°–165° C. The annealing resulted in a shirinkage of about 30 percent in length and width and an 80 percent increase in thickness. The annealed film was then cold drawn to an extension of 200 percent and held at 200 percent extension for 20 minutes. Thereupon the film was allowed to recover elastically at room temperature. The resulting membrane showed the typical microporosity of films of the instant invention. Liquid immersion gave a total void content of about 60 percent.

What is claimed is:

1. A microporous film comprising a thermoplastic, semi-crystalline polymer, said film having an average pore size of from about 10 to about 100 nanometers and having a thickness of from about 3 to about 10 mils.
2. A microporous film according to claim 1 having a thickness of about 7 to about 10 mils.
3. A microporous film according to claim 1 having an average pore
4. A microporous film according to claim 1 made by the process of:
   cold compressing a precursor film comprising said polymer to reduce the thickness thereof by a factor in the approximate range of from 2:1 to 10:1 to form a compressed film; and,
   stretching said compressed film from about 100% to about 500% to impart microporosity to said film.
5. A microporous film according to claim 4 wherein said film has been heat annealed.
6. A microporous film according to claim 4 wherein said stretching is biaxial.
7. A microporous film according to claim 4 wherein said compressing reduces said film thickness by a factor in the approximate range of from 3:1 to 8:1 and further wherein said stretching is in the range of from about 200% to about 300%.
8. A microporous film according to claim 1 wherein said polymer comprises polypropylene or polyethylene.
9. A microporous film comprising a thermoplastic, semicrystalline polymer, said film having an average pore size of from about 20 to about 30 nanometers and having a thickness of from about 3 to about 10 mils, said film being made by the process of:
   cold compressing a precursor film comprising said polymer to reduce the thickness thereof by a factor in the approximate range of from 3:1 to 8:1 to form a compressed film; and,
   biaxially stretching said compressed film from about 200% to about 300% to impart microporosity to said film.
10. A microporous film according to claim 9 wherein said film has been heat annealed.
11. A microporous film according to claim 9 wherein said polymer comprises polyethylene or polypropylene.

* * * * *